Feb. 9, 1954  G. H. SCHAUWEKER  2,668,291
EYE PROTECTIVE DEVICE
Filed May 23, 1952
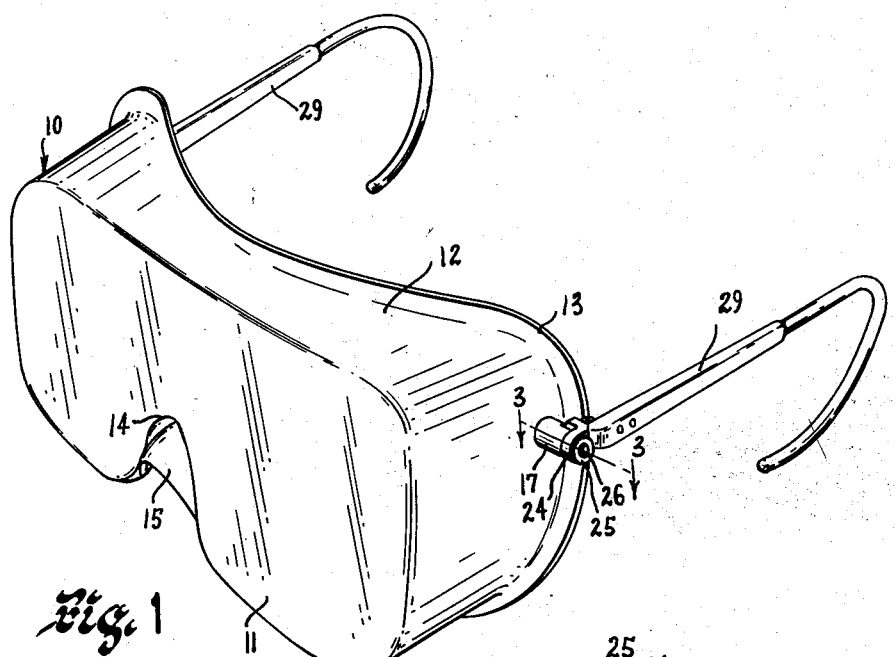
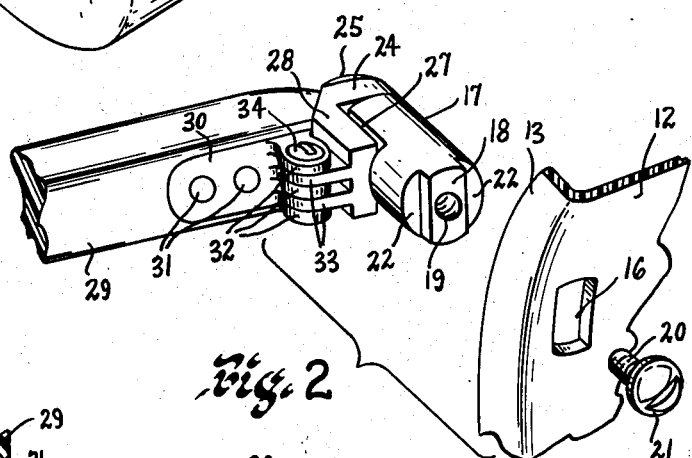
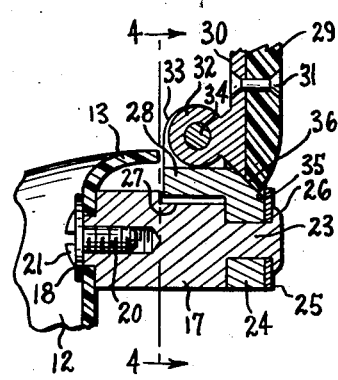
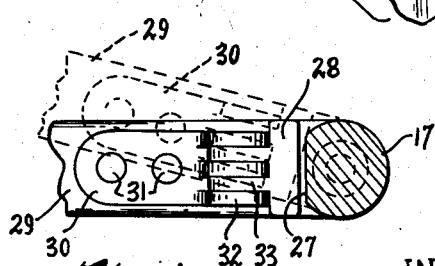
INVENTOR
GEORGE H. SCHAUWEKER
BY
Louis L. Gagnon
ATTORNEY Patented Feb. 9, 1954

2,668,291

UNITED STATES PATENT OFFICE 2,668,291

EYE PROTECTIVE DEVICE

George H. Schauweker, Southbridge, Mass., assignor to American Optical Company, Southbridge, Mass., a voluntary association of Massachusetts Application May 23, 1952, Serial No. 289,604

5 Claims. (Cl. 2—14)

This invention relates to improvements in eye protective devices and has particular reference to eye protective devices of the type embodying a transparent eye shield having interchangeable temples adjustably secured thereto.

One of the principal objects of this invention is to provide an eye protective device embodying an eye shield of transparent material and temples hingedly connected to said eye shield by novel hinge means constructed and arranged to permit said temples to be adjustable about an axis substantially horizontal and parallel with the plane of the front surface of the eye shield whereby the eye shield may be comfortably fitted to and worn upon the face of a wearer and the temples will automatically adjust themselves to comfortably fit over the wearer's ears regardless of the angle at which the eye shield is worn upon the face.

Another object is to provide a device of the above character wherein practically any standard ophthalmic temple having a beveled end and a conventional standard ophthalmic hinge carried thereby may be used with the hinge connection of the present invention.

Another object is to provide a device of the above character wherein eye shields may be easily removed from the temple connections and replacement eye shields simply and quickly attached thereto with no special fitting adjustments or alterations being necessary to properly attach the replacement eye shields to the temples.

Still another object is to provide an eye shield having an opening at each end thereof, temples for connection with the ends of the eye shield, and a novel hinge arrangement for attachment of each of the temples to said eye shield, each of said hinge arrangements comprising a portion shaped to interfit with the respective opening in said eye shield and to be secured therein and a second portion thereof shaped for hinged attachment to a respective temple, said second portion being mounted on said first portion for limited rotative movement thereabout for permitting angular adjustment of the temples whereby the device may be worn more comfortably on a wearer's face.

Other objects and advantages of the invention will become apparent from the following description taken in connection with the accompanying drawing, in which:

Fig. 1 is a perspective view of an eye protective device embodying the invention;

Fig. 2 is an enlarged fragmentary exploded perspective view of a temple hinge connection;

Fig. 3 is an enlarged fragmentary sectional view taken substantially on line 3—3 of Fig. 1 looking in the direction of the arrows; and Fig. 4 is a fragmentary sectional view taken substantially on line 4—4 of Fig. 3 looking in the direction of the arrows.

Referring more particularly to the drawing wherein like characters of reference designate like parts throughout the several views, the device embodying the invention comprises an eye protective device having an eye covering or shield 10 formed of plastic, glass or other similar transparent material. The eye shield 10 is preferably shaped to have a substantially flat front portion 11 and integral sides 12 extending rearwardly thereof around the entire periphery of the front portion 11. The exposed edges of the sides 12 are preferably shaped to fit the general contours of the face of a wearer, with an outwardly turned flange 13 being provided throughout for affording comfortable engagement with the face of a wearer. A nose-engaging recess 14 is formed in the lower central portion of the device in which is suitably positioned, as by cement or the like, a resilient or semi-rigid nose pad 15.

The sides 12 are provided in each of the temple areas thereof with openings 16 (Fig. 2), each opening 16 being spaced slightly forwardly of the flange 13 and having definite predetermined shapes such as oval, rectangular, square, or other than circular.

Each of the temple hinge connecting devices comprises a hinge-supporting member 17 of generally cylindrical shape which is provided with an end portion 18 which is shaped to comate with a respective opening 16 in the sides 12 of the eye shield 10. The end of the portion 18 is provided with a threaded opening whereby when the end portion 18 is inserted in the opening 16 from outside the shield 10, a screw 20 having a large head 21 can be threaded into the opening from inside the shield 10, the inner surface of the head 21 of the screw 20 clamping the sides 12 of the eye shield 10 adjacent the opening 16 firmly against the end surfaces 22 of the supporting member 17.

The opposed end of the supporting member 17 is formed with a portion 23 of reduced diameter (Fig. 3) which rotatably receives thereover an angled hinge plate 24 and washer 25, the extreme end of the reduced portion 23 being headed over as indicated at 26 to retain the parts in assembled relation. The rear side of the supporting member 17 is provided with a flattened area or surface 27 adjacent which is positioned the inwardly extending angled hinge portion 28. The space between the hinge portion 28 and flattened surface 27 is carefully controlled so that the hinge plate 24 may be rotated about the reduced portion 23 of the supporting member 17 to a permissible extent, the extent of rotative movement in either direction being reached when the hinge portion 28 engages an edge of the flattened surface 27.

Since a temple 29 is attached to the hinge portion 28 by means of a hinge plate 30, which is secured by rivets 31 or the like to the temple 29 and which has ears 32 interfitting with ears 33 carried by the hinge portion 28 and retained in connected relation therewith by a hinge screw 34, it will be apparent that the adjustment of the hinge plate 24 upon the supporting member 17 will allow the temple 29 to assume an angular position such as is indicated by dotted lines in Fig. 4. With such an arrangement, it is obvious that as a wearer positions the eye shield 10 upon his face the temple 29, in being fitted over his ears, will automatically adjust themselves to fit thereover to properly support the eye shield in position of use and with no discomfort to the wearer as might otherwise occur. The hinge ears 32 and 33 and hinge pivot screw 34 are so related with the horizontally disposed pivot 23 and with the shield flange 13 as to enable the temples to be folded in compact relation with the shield when not in use.

Since it its desirous that the temples 29 be of conventional ophthalmic design the hinge plate 24 is provided with an inclined surface 35 which is adapted to be engaged by a beveled surface 36 formed on the forward end of the temple 29 and adjacent portion of the hinge plate 30. Such a construction is conventional in ophthalmic manufacture, the abutment of the beveled surface 36 against the inclined surface 35 serving to restrict outward movement of the temples 29.

From the foregoing description it is apparent that all of the objects and advantages of the invention have been accomplished and that an eye shield 10 may be easily and quickly disengaged from the temples 29 merely by removal of screw 20 which will allow the hinge-supporting member 17 to be withdrawn from the openings 16. This is desirous since replacement of eye shields is often necessary, particularly in the case of plastic eye shields which are easily scratched and otherwise marred.

It will be apparent, however, that many changes may be made in the arrangement of parts shown and described without departing from the spirit of the invention. Therefore, it is to be understood that all material shown or described should be interpreted as illustrative and not in a limiting sense.

I claim:

1. An eye protective device comprising a cupped member shaped to surround the eyes of a wearer and having a frontal portion of transparent material and a continuous wall extending rearwardly from said frontal portion and terminating in an outwardly flared face-engaging flange, said continuous wall having an opening in each temporal region thereof spaced slightly inwardly of the adjacent portion of said flange, temple supporting members having end portions shaped to co-mate with the respective openings in said walls and being adapted to be inserted therein from the outside of the cupped member, attachment means secured to said end portions and adapted to be attached thereto from the inside of the cupped member for retaining said temple supporting members substantially immovable in said openings, said temple supporting members being of a length to extend beyond the edge of the flange and each having a reduced end portion, and stop means formed on the side thereof toward the wearer's face, first hinge member rotatably mounted on and extending rearwardly of said reduced portions and axially movable thereabout to the extent permitted by said stop means, and second hinge members hingedly connected with said first hinge members for attachment of temple members to the device.

2. An eye protective device comprising a cupped member shaped to surround the eyes of a wearer and having a frontal portion of transparent material and a continuous wall extending rearwardly from said frontal portion and terminating in face-engaging edge portions, said continuous wall having an opening in each temporal region thereof spaced slightly inwardly of the adjacent face-engaging edge portions, temple supporting members having end portions shaped to non-rotatably co-mate with the respective openings in said walls, means for securing said members in said openings, said members each having a reduced end portion, and a substantially flat surface area formed on the side thereof toward the wearer's face, first hinge members having a portion rotatably mounted on and extending substantially rearwardly of said reduced portions and having an inwardly angled portion spaced slightly from said substantially flat surface area whereby said hinge members may be axially movable about said reduced portion to the extent permitted by said substantially flat surface areas, and second hinge members hingedly connected with said first hinge members for attachment of temple members to the device.

3. An eye protective device comprising a cupped member shaped to surround the eyes of a wearer and having a frontal portion of transparent material and a continuous wall extending rearwardly from said frontal portion and terminating in face-engaging edge portions, said continuous wall having an opening in each temporal region thereof spaced slightly inwardly of the adjacent face-engaging edge portions, temple supporting members having end portions shaped to co-mate with the respective openings in said walls, means for securing said members in said openings, said members each having a reduced end portion, and a substantially flat surface area formed on the side thereof toward the wearer's face, first hinge members having a portion rotatably mounted on and extending substantially rearwardly of said reduced portions and having an inwardly angled portion spaced slightly from said substantially flat surface area whereby said hinge members may be axially movable about said reduced portion to the extent permitted by said substantially flat surface areas, said reduced portions having means on the extreme ends thereof for preventing removal of the first hinge members therefrom, and second hinge members hingedly connected with said first hinge members for attachment of temple members to the device.

4. An eye protective device comprising a cupped member shaped to surround the eyes of a wearer and having a frontal portion of transparent material and a continuous wall extending rearwardly from said frontal portion and terminating in face-engaging edge portions, said continuous wall having an opening in each temporal region thereof spaced slightly inwardly of the adjacent face-engaging edge portions, temple supporting members having end portions shaped to co-mate with the respective openings in said walls, means for securing said members in said openings, said members each having a reduced end portion, and a substantially flat surface area formed on the side thereof toward the wearer's face, first hinge members having a portion rotatably mounted on and extending substantially rearwardly of said reduced portions and having an inwardly angled portion spaced slightly from said substantially flat surface area whereby said hinge members may be axially movable about said reduced portion to the extent permitted by said substantially flat surface areas, said first hinge members each having a portion of its rear surface provided with an area which is inclined rearwardly and inwardly, second hinge members hingedly connected with said first hinge members, and rearwardly extending temples secured to said second hinge members and having their forward ends beveled to abut against said rearwardly and inwardly inclined surfaces on said first hinge means whereby the outward spreading movement of the temples is restricted.

5. An eye protective device comprising a cupped member shaped to surround the eyes of a wearer and having a relatively thin frontal portion of transparent material and a continuous wall extending rearwardly from the edges of said frontal portion and terminating in an outwardly flared face-engaging flange, said continuous wall having an opening of predetermined shape in each temporal region thereof spaced slightly inwardly of the adjacent portion of said flange, temple supporting members having end portions shaped to non-rotatably co-mate with the respective openings in said walls and being adapted to be inserted therein from outside of the cupped member, attachment means secured to said end portion and adapted to be attached thereto from inside of the cupped member for retaining said temple supporting members substantially immovable in said openings, said temple supporting members being of a length to extend beyond the edge of the flange and each having a reduced end portion and a substantially flat surface area formed on the side thereof toward the wearer's face, first hinge members having a portion rotatably mounted on and extending substantially rearwardly of said reduced portions and having an inwardly angled portion spaced slightly from said substantially flat surface area whereby said hinge members may be axially movable about said reduced portion to the extent permitted by said substantially flat surface area, said reduced portions having means on the extreme ends thereof for preventing removal of the first hinge members therefrom, said first hinge members each having a portion of its rear surface provided with an area which is inclined rearwardly and inwardly, second hinge members hingedly connected with said first hinge members, and rearwardly extending temples secured to said second hinge members and having their forward ends beveled for abutment against said rearwardly and inwardly inclined surfaces on said first hinge means whereby the outward spreading movement of the temples is restricted.

GEORGE H. SCHAUWEKER.

References Cited in the file of this patent

UNITED STATES PATENTS

| Number | Name | Date |
| --- | --- | --- |
| 2,274,791 | Huggins | Mar. 3, 1942 |

FOREIGN PATENTS

| Number | Country | Date |
| --- | --- | --- |
| 9,202 | Great Britain | 1885 |
| 363,625 | France | May 10, 1906 |